Oct. 17, 1967 H. WINTER 3,348,198

CODE-CHECKING COMPARATOR CIRCUIT

Filed Aug. 4, 1964 2 Sheets-Sheet 1

INVENTOR
H. WINTER
BY Howard R Popper
ATTORNEY

United States Patent Office 3,348,198

Patented Oct. 17, 1967

3,348,198

CODE-CHECKING COMPARATOR CIRCUIT

Harry Winter, Franklin Township, Somerset County, N.J., assignor to Bell Telephone Laboratories, Incorporated, New York, N.Y., a corporation of New York Filed Aug. 4, 1964, Ser. No. 387,293
16 Claims. (Cl. 340—146.1)

Figure 1:
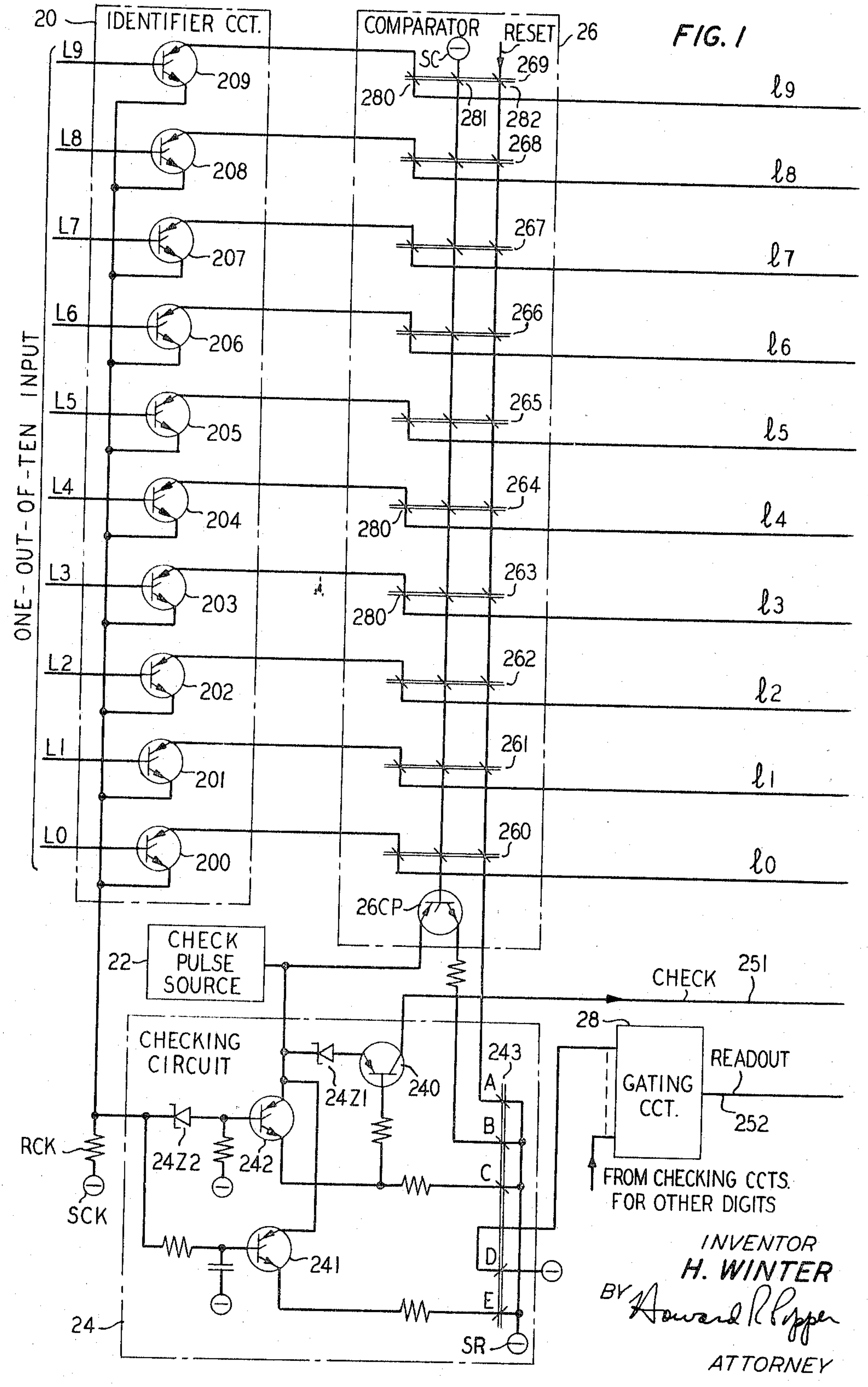

This invention relates to checking circuits and more particularly to such circuits of the comparing type for checking the accuracy and legitimacy of coded signals.

As switching systems have in the recent past become more compact and considerably faster in operation, it is natural to have seen these systems acquire enormous complexity as well. This complexity, while allowing many varied functions to be accomplished by the new systems, has also meant the establishment of increasingly narrower tolerances for the signals used therein, and has particularly required careful design considerations with respect to potential erroneous signals. New and more involved design criteria have thereby become not only appropriate but indeed mandatory in, for example, telephone systems, whether electronic or electromechanical, computing systems, microwave arrangements, etc. A natural concomitant of this increased complexity and narrower tolerance for errors has been a correspondingly increased emphasis upon signal validity and reliability.

Various types of circuits have been designed in the past to cope with this type of problem, but these circuits are often not as compatible with the systems to be checked as would be desired. Moreover, it has been determined that in certain cases, the flexible type of checking arrangement which might add significantly additional reliability to such systems could not be provided. For example, where it is desired to insure the accuracy of a multistep switching sequence, perhaps with a plural readout provision, the type of check desired might be one providing some redundancy as well as different safeguards for each step in the sequence, and most advantageously utilizing the same checking equipment for both of these suggested checking procedures.

It is, therefore, an object of this invention to provide an improved checking and comparing circuit.

It is another object of this invention to provide a flexible and multipurpose checking circuit. A further object of this invention is to insure against, by comparison techniques, errors in any of several steps of a plural step signaling sequence.

Still another object of this invention is to check the accuracy both of all the signaling steps in a particular sequence as well as of the number of composite signals per step.

In one particular embodiment of this invention, input signals are received on a one-out-of-$n$ basis. In processing these input signals, the ultimate aim is to store only accurate and legitimate signals. These signals may, for example, represent digits of a particular dialed telephone directory number, and the present embodiment of my invention is arranged to insure the accuracy of one individual digit thereof. Additional circuits incorporating my invention may be arranged to check on the remaining digits of the hypothetical telephone number, and a common digit storage arrangement on the output end of all checking circuits for all the digits may be arranged to receive a full complement of these digits only when the legitimacy of all the digits has been verified.

An initial identification of the one-out-of-$n$ input is made by an identifier circuit, presumably energizing only one of $n$ identifying elements therein, the elements being, for example, PNPN transistors. Shortly following this selective energization in the identifier circuit, a check pulse source generates a check signal which is transmitted to a checking circuit and thence through a translator, a comparator, back through the energized transistor in the identifier circuit and finally to a checking element, which may be a resistor and which controls a portion of the checking circuit. The passage of the check signal through the translator preliminarily stores therein digital information that corresponds to the one-out-of-$n$ input in anticipation that the signal has been valid. The check signal also selectively energizes one of $n$ switching elements, which may be magnetic cores, in the comparator circuit, the selected core corresponding to the previously selected transistor in the identifier circuit. Finally, the checking resistor element which receives the check signal after its transmission through the selected transistor in the identifier circuit controls the readout attempts from the checking circuit; that is, this portion of the check is to insure that one and only one identifier circuit transistor has been energized. If this is indeed the case, the checking circuit under the control of the checking resistor will attempt to provide a valid readout signal to a gating circuit which is common to all the assumed digits, but, as will be seen shortly, such an output is initially inhibited.

This inhibiting function is achieved by the energization of a control switch element, such as a PNPN transistor, in the comparator circuit which is responsive to the switching of any of the $n$ cores previously mentioned in the comparator circuit. When this comparator control transistor is thereby energized according to the prior description, a signal is transmitted therethrough from the pulse source to the checking circuit, this signal inhibiting the output signal from the checking circuit by, in effect, cancelling out the attempt of a first switch, which may be a PNPN transistor, in the checking circuit to provide such an output signal in response to the above-mentioned energization of the checking resistor.

Thus, after the first check pulse, an inhibited readout from the checking circuit indicates that only one of the $n$ inputs had been energized. When the first check signal has terminated, all the circuits elements return to their normal condition except for the temporary storage elements in the translator, which elements may also be magnetic cores, and the one switched core in the comparator circuit.

The next portion of the check is to determine the comparative accuracy of two successive input signals. That is, it is now to be checked that on a second addressing of the identifier circuit elements, the same single identifying transistor as was previously energized is again so affected. It it is assumed that on the second addressing the same identifier transistor is, in fact, re-energized, a sequence similar to that previously described is initiated. Thus, the check pulse source furnishes another check signal through the checking circuit, through the already switched cores of the translator and the comparator, and to the checking resistor through the re-energized transistor in the identifier circuit. In response to the energization of the checking resistor as before, the first PNPN transistor in the checking circuit again attempts to provide an output signal to the common gating circuit. This time, however, the attempt is successful due to the lack of any inhibiting effect from the comparator control transistor, now de-energized. The comparator control transistor is in a disabled condition since there had been no new switching of any core in the comparator circuit; the second check signal had instead proceeded through the already switched comparator core (switched by the first check signal) and continuing with the assumption that the same input is forthcoming on this second attempt, the comparator control transistor will not be energized.

The input to the common gating circuit for this particular digit is thereby activated and if the checking of the other digits is equally successful at this point, the output conductor from the gating circuit is also energized. This energization is transmitted over a common lead to read out the stored information from the translators for all the digits, thus furnishing an output digit storage circuit with the final verified transmitted digits.

One possible error which my invention detects is when successive inputs to the identifier circuit do not agree. Under these circumstances, the first check pulse, following the energization of a first identifier transistor, serves to switch certain translator cores and a single core in the comparator circuit just as was previously described. The checking circuit output is also similarly inhibited at this point. When the second addressing of the identifier circuit energizes a transistor different from that energized on the first addressing, the circuit proceeds to operate in effect as if there had been no prior addressing input; thus, the second check pulse is effective to set different switching cores in the translator and in the comparator circuit. The switching of a different core in the comparator circuit re-energizes the comparator control transistor (which ordinarily would remain disabled during the second addressing), and an inhibiting effect is again provided to the checking circuit, again preventing an output to the common gating circuit at this point. When this type of disagreement occurs, it is possible to have supervisory personnel called in immediately to personally check on the discrepancy. Alternatively, a modification of this embodiment of the invention may be arranged to initiate another pair of addressing sequences. If the latter course is chosen, the cores in the comparator and the translator are reset to erase any stored information. The "new" pair of addressing sequences again involves the sequential comparison of a pair of digits. The identifier, comparator and translator circuits are energized as before and if the comparison is successful, the desired output signal to the common gating circuit will be furnished in a manner substantially identical to that described earlier. If on the other hand, the disagreement persists, the fourth check signal will result in the energization of the comparator control transistor, again inhibiting an output signal from the checking circuit.

Another switching system difficulty, the inaccurate results of which can be eliminated by my invention, is the simultaneous addressing of more than the appropriate single input. Suppose, by way of example, that the first step in the addressing sequence erroneously energizes two distinct identifier circuit transistors rather than one. The circuit begins to proceed as before whereby the check pulse source provides a check signal through the checking circuit and through the cores in the translator and comparator circuits corresponding to both of the addressed inputs. This signal also proceeds through each of the two energized identifier circuit transistors to the checking resistor which controls the checking circuit. However, in response to the energization of the checking resistor by the check signal having been delivered thereto over two separate electrical paths, the signal level furnished by this resistor is arranged to be twice as high as it was when only one identifier circuit transistor was energized. Under these conditions, two switches in the checking circuit are energized instead of the usual one. The first of these switches is the "usual" PNPN transistor which attempts in this and other single input addressings to provide an output signal to the common gating circuit. The second switch in the checking circuit, which switch may comprise a Zener diode-baised PNPN transistor, responds only when the checking resistor is energized to the higher level already mentioned and its energization achieves two results. Initially, it inhibits the output signal attempt by the first transistor much in the same manner as did the comparaor control transistor previously discussed. The energization of the second biased transistor additionally serves to interrupt the transmission path of the check signal and to thereby effectively prevent the switching of the erroneously addressed cores in the translator and comparator circuits. This second function can be accomplished due to the relative speeds with which the second switch turns on as compared to the switching time of the translator and comparator magnetic cores. The translator and comparator cores are thereby advantageously prevented from being switched despite their having been preliminarily addressed by the first check signal, and consequently the comparator control transistor is not energized.

The alternatives available at this point in the switching sequence are either to disregard the sequence as a detected error, or to summon supervisory personnel to rectify the difficulty, or to proceed with additional addressing attempts. If the additional addressing attempts alternative is selected, the circuits may be arranged to operate as before, checking on the comparative accuracy of successive attempts, but perhaps allowing only two additional attempts after the first simultaneous addressing failure.

It is therefore a feature of my invention that a code checking circuit comprise series-connected identifier, comparator, and translator circuits so arranged that successive check pulses passing through identical elements on successive identifications of a coded input initially cause a check circuit output to be inhibited but then allow a check circuit output on the second identification.

It is a further feature of my invention that the comparator circuit comprise switching elements, such as magnetic cores, and a common switch control element, such as a transistor, which transistor is energized on the switching of any core by the first check pulse to inhibit the check circuit output but is energized due to the second check pulse only if an erroneous identification has been detected.

It is another feature of my invention that the identifier circuit include individual transistors for each input signal and the check circuit includes a common switching element, such as PNPN transistor, to sense the addressing currents in a common summing resistor connected to all of the identifier transistors. Further in accordance with this aspect of my invention, the check circuit includes a Zener idode-biased PNPN transistor for preventing the magnetic cores in the comparator circuit from switching if more than one input is addressed, the biased transistor switching to disable another transistor, thus cutting off all input addressing paths to the comparator and translator cores.

It is still another feature of my invention that the series path for the check pulses includes both a check circuit transistor and the simultaneously addressed cores, but the race condition established between the switching times of the transistor and the cores is such that, while the cores are initially placed in a switching mode, their switching is prevented by the interruption of the series path on switching of the check circuit transistor.

Figure 2:
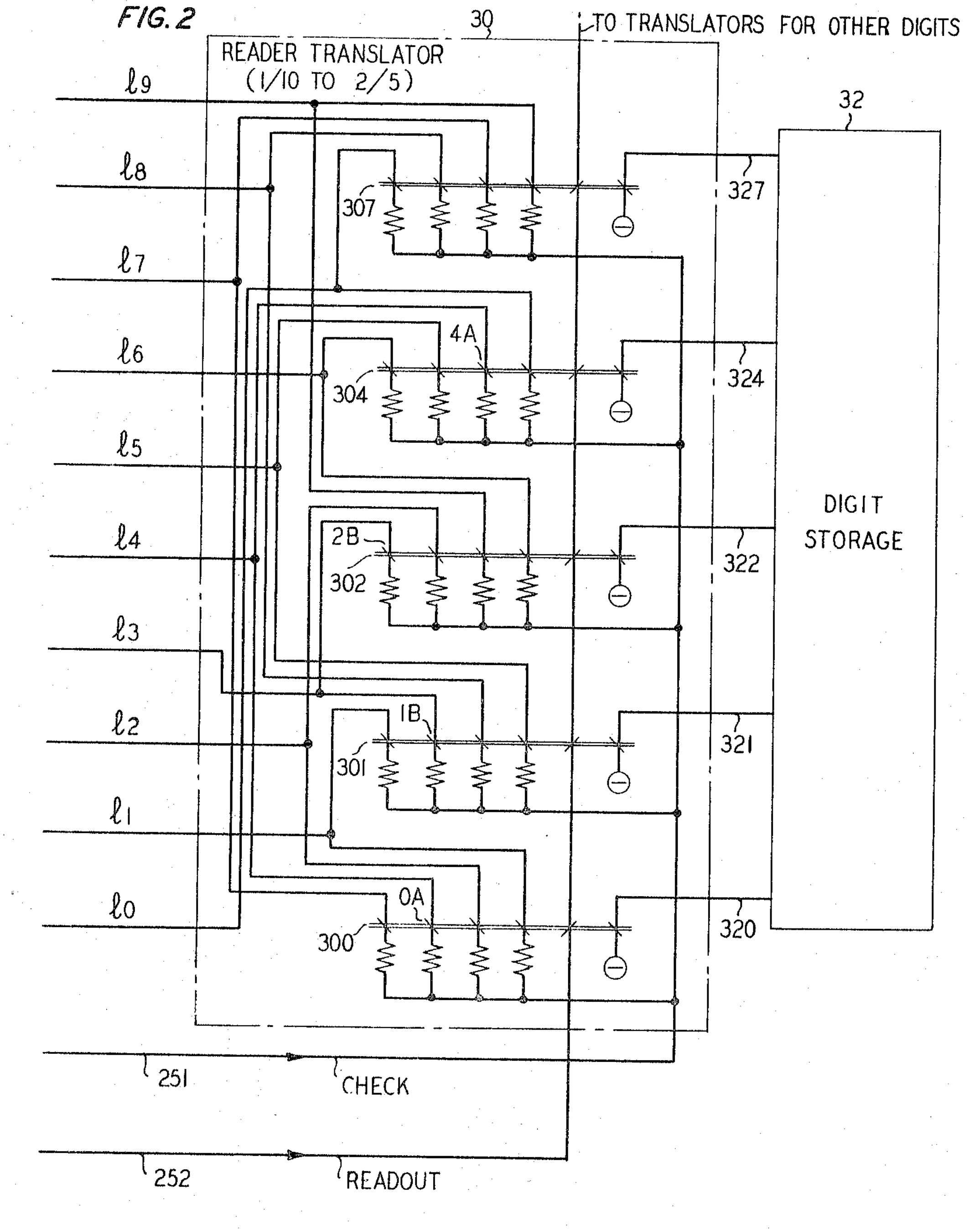

These and other objects and features of this invention will be more readily understood with reference to the following specification, appended claims and attached drawing, in which:

FIGS. 1 and 2, when placed side by side, depict a schematic representation of one illustrative embodiment of my invention.

Turning now to the drawing, FIGS. 1 and 2 together depict one specific illustrative embodiment of my invention wherein a code-checking comparator circuit checks for the validity of a one-out-of-ten input. In the electronic switching system such input codes may be obtained from scanners and two successive scanner outputs are checked in accordance with my invention.

As seen in the drawing, the code-checking circuit comprises an identifier circuit 20, a comparator circuit 26, a translator circuit 30, a checking circuit 24, and a check pulse source 22.

The check pulse source 22 delivers a signal to the checking circuit 24. Each of the circuits is then arranged in a series path and elements of these circuits, as described below, are energized by this check signal. Specifically the check signal proceeds through the translator 30, the comparator circuit 26, and the identifier 20 back through the checking circuit 24 again.

Before discussing the circuit operation for both valid and invalid inputs, let us consider each of these circuits themselves. The identifier circuit 20 includes ten PNPN transistors 200–209 each of which is respectively energized when an input signal appears on one of leads L0–L9. The coded input to the identifier circuit 20 is, in this specific embodiment, in a one-out-of-ten code although it will be appreciated that any similar one-out-of-*n* or a suitable *x*-out-of-*n* code could be chosen.

Corresponding to each of the identifier circuit "stages" or elements are the similar stages in the comparator circuit 26. The symbolism and terminology for the magnetic core portions of the circuitry to be described herein are based on the well-known "mirror symbol" techniques described for example in the article "Pulse-Switching Circuits Using Magnetic Cores," by M. Karnaugh, I.R.E. Proceedings, vol. 43, pages 570–583, May 1955. Each of the comparator magnetic cores 260–269 has three windings thereon, a setting winding 280 which tends to set the core to the left (its normal condition is set to the right), an output winding 281 connected to the control base electrode of comparator PNPN transistor 26CP and responsive to the switching of any of cores 260–269 to the left to energize that transistor, and a reset winding 282.

The checking circuit 24 has as its basic output element the magnetic core 243 with five windings thereon. Winding A is a reset winding to reset or maintain core 243 switched in its downward orientation. Winding E is responsive to the energization of PNPN transistor 241 to attempt to switch core 243 in the upward direction and thereby provide a proper polarity output signal to output winding D connected to the common gating circuit 28. The PNPN transistor 241 is in turn energized in response to a particular voltage drop across summing check resistor RCK. Windings B and C on core 243 are both inhibiting windings which, at different times and under different circumstances in the switching sequence to be detailed below, inhibit the switching of core 243 in the upward direction by creating a magnetic flux in the core in the downward direction. More specifically, inhibiting winding B achieves its inhibiting function by virtue of the energization of comparator transistor 26CP, thereby permitting check pulse source 22 to deliver the inhibiting signal through the transistor to winding B and thence to negative potential source SR. Inhibiting winding C produces its downward flux when PNPN transistor 242 is energized; this occurs when the potential drop across summing check resistor RCK is sufficiently high so as to overcome the back bias of Zener diode 24Z2. Finally, normally-energized transistor 240 is situated in the transmission path of the check signal (between check pulse source 22 and the check lead 251 and remains energized as long as PNPN transistor 242 is off. However, when transistor 242 is energized as indicated above, the rising voltage thereby developed at the base of transistor 240 serves to cut off that transistor.

The reader translator 30 shown on FIG. 2 serves to deliver the check signal from the check input lead 251 through the cores 300, 301, 302, 304 and 307 in various two-out-of-five combinations and out on one of leads *l0–l9*, back to the comparator circuit 26. During the course of the signal's transmission through the reader translator 30, two of its five cores will be set to the left depending upon which one of identifier circuit 20 transistors 200–209 is energized. This will be seen to provide an initial translation from the one-out-of-ten input code to the well-known-two-out-of-five code, such translated information remaining stored in the reader translator 30 until its readout lead 252 is energized by a signal from the common gating circuit 28. The readout signal resets the two previously switched translator cores back to the right and achieves a transfer of the information from the translator 30 to the digit storage circuit 32, again in the two-out-of-five code.

*Successful check*

In the context of this embodiment of my invention, a successful check consists of the successive energization of the same one of input leads L0–L9 on two addressing attempts. As applied, for example, to the identification of a telephone directory number (by equipment not shown), it may indicate that the same digit has been identified on two successive identification attempts thereby indicating the high degree of probability that the identification has been an accurate one. To proceed with a specific example, let it be assumed that the hypothetical telephone directory number digit to be identified is the digit 4.

The first input to the identifier circuit 20 will, therefore, be over input lead L4 thereby energizing PNPN transistor 204. Check pulse source 22 can be arranged in a well-known manner to transmit its signals in response to the energization of any of transistors 200–209. On the other hand, it may be convenient to make check pulse source 22 a continuously pulsing circuit; if this alternative is chosen, proper operation is insured since no other circuit elements can be effected until one of the transistors 200–209 turns on. When transistor 204 is thereby energized, a path is now available for a pulse from check pulse source 22 to energize particular circuit elements. More specifically, the signal proceeds as the first check signal from source 22 through Zener diode 24Z1, the emitter-collector circuit of normally-energized transistor 240, and over check lead 251 to the reader translator circuit 30. Since transistor 204 was energized, the check signal proceeds from check lead 251 from right to left through the translator 30 emerging on lead *l4*. As the signal proceeded through the translator 30, cores 300 and 304 have been switched to the left in response to the check signal having passed through windings 0A and 4A, respectively.

In the comparator circuit 26, core 264 is set to the left in response to the passage of this first check signal through its set winding 280. The signal then passes through the active electrode path of energized transistor 204 and to negative potential source SCK through check resistor RCK. At this point in the switching sequence, cores 300 and 304 in the translator 30 and core 264 in the comparator 26 are switched to the left.

In response to the passage of the first check signal through summing check resistor RCK, the potential drop thereacross is arranged to be sufficient to energize PNPN transistor 241 but insufficient to overcome the reverse bias provided by Zener diode 24Z2 to PNPN transistor 242. It being energized, transistor 241 provides a portion of the signal from check pulse source 22 through the transistor's active electrode path to winding E on core 243 thereby tending to set that core upward. However, the switching of comparator core 264 also energized comparator transistor 26CP, so that a signal from source 22 can proceed through the active electrode path of transistor 26CP to inhibiting winding B on core 243, thus preventing any switching of core 243 at this time by creating an opposite downward flux therein. Transistors 242 and 26CP become de-energized when the signals to their active electrode paths have terminated. And magnetic cores 300, 304 and 264 remain switched to the left.

On the second addressing attempt whereby lead L4 is again assumedly energized, transistor 204 is again turned on. The checking procedure thereafter operates in a manner much the same as previously described. That is, a second check signal proceeds from check pulse source 22 through Zener diode 24Z1, transistor 240, over check lead 251 and through windings 0A and 4A on cores 300 and 304 respectively, lead *l4*, setting winding 280 on core 264 and finally through the active electrode path of transistor 204 to negative battery SCK through resistor RCK. However, a noticeable operational difference can be seen to exist at this time. Since magnetic cores 300, 304 and 264 were already in their saturated left-oriented conditions, the passage of the second check signal through the setting windings thereon has no effect on the cores' magnetic state. The cores therefore remain in such a state, and, more importantly, the failure of any comparator cores 260–269 to switch a new leaves comparator transistor 26CP in the disabled state, thus preventing any inhibiting effect therefrom.

When PNPN transistor 241 is again energized in response to the drop across resistor RCK and a portion of the signal from source 22 is provided through the active electrode path of transistor 241 to winding E on core 243, no other winding on that core receives a coincidental signal due to the disabled state of transistors 26CP and 242. Core 243, therefore, is switched upward and is thus able, by virtue of output winding D, to provide a proper polarity output signal to gating circuit 28.

Gating circuit 28 receives inputs from other similar output windings of other similar checking circuits corresponding to the other digits in the signaling sequence (for example, other digits of the telephone directory number). Assuming that the checks from the other digit checking circuits were also successful in providing an output to the gating circuit 28, its readout lead 252 will be energized and will provide a readout signal to the common readout windings on all the translator cores for all the digits. With respect to the translator 30, the readout signal proceeds upward through each of the readout windings on all of the five cores therein and attempts to switch each of them to the right. It is clear that the only cores which can so switch to the right are those which had previously switched to the left in response to the first check signal namely, cores 300 and 304. The switching of cores 300 and 304 to the right provides a proper polarity output signal to the output windings on each of these cores, and thus stores the digit 4 in the digit storage circuit 42 by providing signals thereto over leads 320 and 324.

*Type I failure—different inputs on successive addressings*

Since the one-out-of-ten code depends for its accuracy on the same lead input to the identifier circuit 20 being energized on successive addressings, it is imperative that a code-checking circuit be arranged to detect any error in the input signal. Thus, when one of leads L0–L9 is energized on the first identification attempt and a second different lead is energized on the second attempt indicating an identification discrepancy, the circuit must be arranged to prevent any output to the common gating circuit 28. My invention achieves this prevention in the following manner.

If it is assumed that the first identifier lead to be energized is again lead L4, the operation of the invention is identical to that described above with respect to the first identification attempt in the successful sequence, resulting in translator cores 300 and 304 as well as comparator core 264 being switched to the left at the end of the first check signal. Now, however, assume that a "Type I" error takes place so that the second identifier lead addressed is, for example, L3. Under this assumption, identifier transistor 203 is energized, thereby allowing the second check signal to proceed from source 22 to negative battery SCK over a slightly different path which includes Zener diode 24Z1, transistor 240, check lead 251 to the translator 30, windings 1B and 2B on cores 301 and 302 respectively, lead *l*3, the set winding 280 of comparator core 263, the active electrode path of energized transistor 203 and check resistor RCK. Cores 301, 302 and 263 are thereby set to the left whereas the first check signal had set cores 300, 304 and 264 to the left. It is not critical at this point to immediately determine which of the two addressings (L3 or L4) is the correct one or if indeed either of them is correct. The invention need only be capable of determining that there is a discrepancy between the two addressings. This is achieved by the failure of checking circuit 24 to provide an output to the common gating circuit 28 even after the second addressing to the identifier circuit 20. This in turn is due to the inhibiting effect again provided as a result of the second check signal switching core 263 to the left, thereby re-energizing comparator transistor 26CP. This, of course, is in sharp contrast to the operation of the second check signal when the successive identifications were the same since under those conditions, a comparator core, although addressed by both check signals, was only able to switch in response to the first check signal.

By virtue of the re-energization of transistor 26CP, inhibiting winding B on core 243 is again energized and prevents core 243 from switching in response to the energization of winding E thereon when transistor 241 is energized. Thus, after two identification attempts in which the identifier circuit 20 was addressed by two different inputs, there has been no output signal to the gating circuit 28 and consequently no possibility of readout from the translator 30 to the digit storage circuit 32. My circuit has thereby accomplished its purpose by preventing readout when an addressing discrepancy has been determined to exist and equipment (not shown) may now operate to take corrective measures.

*Type II failure—simultaneous addressing of more than one input*

This type of error is potentially dangerous in many switching systems in that such systems' error-detecting equipment is only capable of detecting discrete or successive errors such as the one described as a Type I failure above. With a Type II failure, it may be assumed that more than one of leads L0–L9 is simultaneously addressed, for example, leads L3 and L4.

Identifier transistors 203 and 204 are thereby energized and the system begins to operate initially as previously described. That is, check pulse source 22 provides a check signal which proceeds through Zener diode 24Z1, transistor 240, check lead 251, windings 0A, 1B, 2B and 4A on translator cores 300, 301, 302 and 304, respectively, leads *l*3 and *l*4 simultaneously, the setting windings 280 on comparator cores 263 and 264, and the active electrode paths of energized transistors 203 and 204 to negative battery SCK through check resistor RCK. It should be emphasized at this point, however, that although the passage of this check signal through the winding on cores 300, 301, 302, 304, 263 and 264 tends to set those cores to the left, the finite switching time of these cores has not yet elapsed and, in fact, they have not received sufficient pulse energy at this instantaneous point to fully switch. However, resistor RCK has developed its full voltage drop which, in this case, due to the energization of two identifier transistors, is arranged to be approximately twice as great as when one identifier transistor is energized.

Under such circumstances, not only is PNPN transistor 241 energized, but the reverse bias of Zener diode 24Z2 is overcome by the higher voltage drop in resistor RCK and transistor 242 is energized as well. The energization of transistor 242 accomplishes two distinct functions. Initially, it provides a portion of the signal from pulse source 22 through the active electrode path of transistor 242 to inhibiting winding C on core 243 to prevent that core from switching when winding E is excited responsive to the energization of transistor 241. Thus, no output is provided from checking circuit 24 to the common gating circuit 28.

Equally as important for achieving the purposes of the invention is to prevent the setting of any cores in the translator 30 or the comparator 26 so that these circuit portions will be cleared for subsequent addressing sequences. This purpose is also achieved by the energization of PNPN transistor 242 which can in this case be considered an "alarm" transistor. Specifically, the energization of transistor 242 causes the voltage signal connected to the base of transistor 240 to increase from the negative value represented by source SR, and shortly following the energization of transistor 242 (perhaps a few nanoseconds thereafter), transistor 240 is cut off. This can be seen to interrupt the transmission path of the check signal which is proceeding over the previously traced paths between pulse source 22 and negative battery SCK. The almost immediate deterioration of this signal in response to the disabling of transistor 240 prevents any of cores 300, 301, 302, 304, 263 or 264 from switching, the switching times of these cores being in the order of 5 microseconds. Thus, even though more than one identifier transistor was addressed simultaneously and even though signals were transmitted through setting windings on cores in the translator 30 and the comparator 26, my invention prevents the actual switching of these erroneously addressed cores. Additional well-known equipment (not shown) which may, for example, operate in response to the energization of transistor 242, may be relied upon for example to call in the supervisory personnel referred to above when such an erroneous simultaneous addressing takes place, or to disregard this sequence as a detected error.

It is to be understood that the above-described arrangements are illustrative of the application of the principles of the invention. Numerous other arrangements may be devised by those skilled in the art without departing from the spirit and scope of the invention.

What is claimed is:

1. A code-checking circuit comprising identification means for initially registering an input digit in a first code, means for translating said first code digit to a second code, storage means for storing said digits, checking means for transferring said translated digit from said translating means to said storage means, a check element coupled to said checking means, pulsing means for furnishing an inhibit signal to inhibit said checking means and for furnishing check signals to energize said translating means and said check element, comparator means responsive to a first of said check signals to control the passage of said inhibit signal to said checking means and responsive to a second of said check signals for preventing the passage of said inhibit signal to said checking means if said identification means is successively energized by identical input digits, and means in said checking means responsive to the energization of said check element for precluding the transfer operation of said checking means when said identification means is simultaneously energized by more than one digit.

2. A code-checking circuit in accordance with claim 1 wherein said comparator means includes a PNPN transistor and a plurality of remanent magnetic cores, and an output winding on each of said cores responsive to the switching of the respective one of said cores for energizing said transistor to transmit said inhibit signal to said checking means.

3. A code-checking circuit in accordance with claim 1 wherein said checking means includes a control core with a plurality of windings wound thereon, a first PNPN transistor for energizing one of said windings to switch said control core in response to the energization of said check element, and a second PNPN transistor for energizing another of said windings to inhibit the switching of said control core in response to the energization of said check element when said identification means is simultaneously energized by more than one digit.

4. A code-checking circuit in accordance with claim 1 wherein said check element is a summing resistor.

5. A code-checking circuit comprising a plurality of $n$ identifier transistors each responsive to an input signal in a one-out-of-$n$ code, a pulse source for generating a check signal, a summing resistor connected in common with all of said identifier transistors, a plurality of $n$ comparator cores each individually responsive to said check signal when the corresponding one of said identifier transistors has been energized, output storage means, a checking core for controlling the storage of said coded signals in said storage means, a comparator transistor energizable in response to the switching of any of said comparator cores for inhibiting said checking core, and a check transistor responsive to a predetermined potential drop across said summing resistor for switching said checking core.

6. A code-checking circuit in accordance with claim 5 including in addition an alarm transistor responsive to a potential drop across said summing resistor greater than said predetermined potential drop, and wherein said checking core has wound thereon an energizing winding for generating magnetic flux in a first direction in said core in response to the energization of said check transistor, a first inhibiting winding for generating magnetic flux in a second direction opposite to said first direction in said core in response to the energization of said comparator transistor on the first of said inputs and a second inhibiting winding for generating magnetic flux in said second direction in said core in response to the energization of said alarm transistor when more than one of said identifier transistors is energized.

7. A code-checking circuit in accordance with claim 6 including in addition means for translating said input signal from said one-out-of-$n$ code to a different code, a driving transistor responsive to said pulse source for transmitting said check signal to said translating means to temporarily store therein said input signal in said different code, and means responsive to the energization of said alarm transistor for disabling said driving transistor prior to the switching of any of said comparator cores, said checking core being responsive to the sole energization of said check transistor for shifting said input signal from said translating means to said output storage means.

8. A code-checking circuit comprising a plurality of $n$ magnetic cores settable to register a digit on an $x$-out-of-$n$ basis, a setting winding and an output winding individual to each of said cores, setting current summing means common to all of said setting windings, means including a driving transistor for transmitting setting current to said setting windings on an $x$-out-of-$n$ basis, first means coupled to said summing means and responsive to the setting of a predetermined number of said cores for delivering an output signal, and second means coupled to said summing means and responsive to an attempt to set more than said predetermined number of said cores for disabling said driving transistor and inhibiting said output signal.

9. A code-checking circuit in accordance with claim 8 including in addition a comparator transistor connected in common to each of said output windings and energizable in response to the setting of any one of said cores for inhibiting said output signal.

10. A code-checking circuit in accordance with claim 8 wherein said first means includes a PNPN transistor and said second means includes a PNPN transistor and a Zener diode.

11. A code-checking circuit comprising a plurality of input leads, a comparator storage means corresponding to each of said input leads, a translator circuit including temporary storage means, a check pulse source, means responsive to the energization of one of said input leads for causing a check pulse from said source to pass through one of said temporary storage means and one of said comparator storage means, output means responsive to said check pulse, and means responsive to the energization of any one of said comparator storage means for inhibiting the energization of said output means.

12. A code-checking circuit in accordance with claim 11 wherein said output means includes a summing resistor, means connecting said resistor to each of said comparator storage means, output pulse generating means, and means responsive to the voltage across said resistor for energizing said output pulse generating means.

13. A code-checking circuit in accordance with claim 12 wherein said output pulse generating means comprises a magnetic core and said inhibiting means includes a winding on said core.

14. A checking circuit comprising a magnetic core having a plurality of windings thereon, a check pulse source for generating a check signal, a plurality of input leads, means responsive to said check pulse source for comparing an immediately prior energization of one of said input leads with a current energization of one of said input leads and for applying a first inhibit signal to said core on failure of said comparison, means responsive to said check pulse source for applying an enable signal to said magnetic core in response to energization of any of said input leads, and means responsive to said check pulse source for applying a second inhibit signal to said magnetic core in response to energization of more than one of said input leads and for simultaneously interrupting said check signal.

15. A code-check circuit comprising a plurality of input leads, a comparator magnetic core means corresponding to each of said input leads, a translator circuit including translator magnetic core means, a check pulse source, means connecting said check pulse source in a series circuit including at least one of said translator core means and one of said comparator core means dependent upon the energization of a particular one of said input leads, and means included in said series circuit and responsive to the energization of more than one of said input leads for interrupting said series circuit prior to the switching of said comparator and translator magnetic core means.

16. In combination, a plurality of input leads, a comparator magnetic core corresponding to each of said input leads, an output magnetic core, a check pulse source for generating a check signal, means responsive to said check signal for switching said comparator cores dependent on the energization of said corresponding input leads, means responsive to the switching of any of said comparator cores for inhibiting switching of said output core, means responsive to the energization of any of said input leads and to said check signal for attempting to switch said output core, and means responsive to said check signal and to the energization of more than one of said input leads for inhibiting switching of said output core and for interrupting said check signal.

References Cited

UNITED STATES PATENTS

| | | | |
|---|---|---|---|
| 2,905,934 | 9/1959 | Flint | 340—347 |
| 2,973,506 | 2/1961 | Newby | 340—147 |
| 3,222,669 | 6/1962 | Lee | 340—347 |

FOREIGN PATENTS

| | | |
|---|---|---|
| 902,094 | 7/1962 | Great Britain. |

MALCOLM A. MORRISON, *Primary Examiner.*

C. E. ATKINSON, *Assistant Examiner.*